US007392727B1

(12) United States Patent
Chiang

(10) Patent No.: US 7,392,727 B1
(45) **Date of Patent: *Jul. 1, 2008**

(54) TOOL DEVICE FOR DRIVING VARIOUS TOOL MEMBERS

(75) Inventor: Wen Hung Chiang, Taichung Hsien (TW)

(73) Assignee: Hsin Ying Enterprise Co., Ltd., Wantien Tsuen, Sadu Hsian, Taichung, Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/729,259

(22) Filed: Mar. 27, 2007

(51) Int. Cl.
*B25B 13/00* (2006.01)
*B25B 23/16* (2006.01)
*B25G 1/00* (2006.01)
*B23B 45/18* (2006.01)
*B23B 5/22* (2006.01)

(52) U.S. Cl. .................. 81/124.4; 81/177.85; 81/177.2; 173/132

(58) Field of Classification Search ................ 81/124.4, 81/177.85, 177.2, 185; 173/132; 403/325
See application file for complete search history.

(56) References Cited

U.S. PATENT DOCUMENTS

| | | | | |
|---|---|---|---|---|
| 1,471,451 | A * | 10/1923 | Crimp | 81/185 |
| 5,934,384 | A * | 8/1999 | Wang | 173/132 |
| 6,270,085 | B1 | 8/2001 | Chen et al. | 279/22 |
| 6,637,755 | B2 | 10/2003 | Chen et al. | 279/22 |
| 6,976,411 | B1 * | 12/2005 | Yu | 81/177.2 |
| 2006/0145431 | A1 * | 7/2006 | Chang | 279/74 |

* cited by examiner

*Primary Examiner*—Joseph J. Hail, III
*Assistant Examiner*—Alvin J Grant
(74) *Attorney, Agent, or Firm*—Charles E. Baxley

(57) ABSTRACT

A tool device includes a tool shank having a noncircular engaging hole for slidably receiving a socket member which includes a noncircular bore for engaging with various fasteners, a biasing device may bias the socket member outwardly relative to the engaging hole of the tool shank, and an anchoring device may detachably and slidably anchor the socket member to the tool shank. One or more socket members may be replaced with each other for driving various tool members of different sizes or diameters or dimensions. A control ferrule may be slidably engaged onto the tool shank and selectively engageable with the detent and for selectively forcing the detent to engage with the socket member.

10 Claims, 5 Drawing Sheets

TOOL DEVICE FOR DRIVING VARIOUS TOOL MEMBERS

BACKGROUND OF THE INVENTION

1. Field of the Invention

The present invention relates to a tool device, and more particularly to a tool device including one or more auxiliary socket members replaceable or changeable with each other for receiving and for driving various tool members of different sizes or diameters or dimensions.

2. Description of the Prior Art

Typical tool devices comprise a tool shank or socket having an engaging hole formed in one end thereof for receiving a tool bit or tool member, and a retaining or anchoring device attached onto the tool shank or socket for detachably securing the tool bit or tool member to the tool shank or socket.

For example, U.S. Pat. No. 6,270,085 to Chen et al. discloses one of the typical chuck devices for tool bits and also comprising a tube having a longitudinal engaging hole formed in one end thereof for receiving a tool bit or tool member, and a retaining or chuck device attached onto the tube for detachably securing the tool bit or tool member to the tube.

However, the longitudinal engaging hole of the tube may be used for receiving a tool bit or tool member of a single size only, and the tube may not be separated or disengaged from the chuck device such that the typical chuck device and the tube may not be replaced or changed with each other and may be used for receiving the tool bit or tool member of a single size only.

U.S. Pat. No. 6,637,755 to Chen et al. discloses another typical chuck device for tool bits and also comprising a socket having a longitudinal engaging hole formed in one end thereof for receiving a tool bit or tool member, and a retaining or chuck device attached onto the tube for detachably securing the tool bit or tool member to the socket.

However, similarly, the longitudinal engaging hole of the socket may be used for receiving a tool bit or tool member of a single size only, and the socket may not be separated or disengaged from the chuck device such that the typical chuck device and the socket may not be replaced or changed with each other and may thus be used for receiving the tool bit or tool member of a single size only.

The present invention has arisen to mitigate and/or obviate the afore-described disadvantages of the conventional tool shanks or sockets or tool devices.

SUMMARY OF THE INVENTION

The primary objective of the present invention is to provide a tool device including one or more auxiliary socket members replaceable or changeable with each other for receiving and for driving various tool members of different sizes or diameters or dimensions.

In accordance with one aspect of the invention, there is provided a tool device comprising a tool shank including an engaging hole formed in one end of the tool shank, and the engaging hole including a noncircular cross section, a socket member slidably engaged into the engaging hole of the tool shank and including a noncircular outer peripheral portion for engaging with the noncircular engaging hole of the tool shank and for allowing the socket member to be rotated or driven by the tool shank, the socket member including a bore formed therein and having a noncircular cross section, a biasing device for biasing the socket member outwardly relative to the engaging hole of the tool shank, and an anchoring device for detachably and slidably anchoring the socket member to the tool shank.

The biasing device includes a spring member engaged into the engaging hole of the tool shank for applying a spring biasing force against the socket member. The biasing device includes a follower slidably received and engaged into the engaging hole of the tool shank and disposed between the socket member and the spring member. The follower includes a cavity formed therein for receiving one end of the spring member.

The biasing device includes a magnetic attractive member attached to the follower and acted with the socket member for attracting the socket member to the follower and for preventing the socket member from being disengaged from the tool shank. The follower includes a space formed therein for receiving the magnetic attractive member.

The biasing device includes an anchor engaged into the engaging hole of the tool shank for engaging with a first end of the spring member. The anchor includes an aperture formed therein for receiving the first end of the spring member.

The anchoring device includes an orifice formed in the tool shank, and a detent slidably received and engaged into the orifice of the tool shank and extendible into the engaging hole of the tool shank for engaging with the socket member and for detachably anchoring the socket member to the tool shank.

The socket member includes at least one recess formed in an outer peripheral portion thereof for selectively receiving the detent and thus for detachably securing the socket member to the tool shank.

The socket member includes at least one stop extended into the recess of the socket member and located at one end portion of the recess of the socket member for engaging with the detent and for selectively and detachably anchoring the socket member to the tool shank.

The socket member includes a number of flat surfaces formed in the outer peripheral portion thereof, and the recess is formed and located between adjacent flat surfaces of the socket member for engaging with the detent.

The anchoring device includes a control ferrule slidably engaged onto the tool shank and selectively engageable with the detent and for selectively forcing the detent to engage with the socket member.

The control ferrule includes a peripheral depression formed in an inner peripheral portion thereof for selectively receiving the detent and for forming an actuator which is selectively engageable with the detent to selectively force the detent to engage with the socket member.

The tool shank includes a retaining ring attached onto an outer peripheral portion thereof, and the control ferrule includes a bore formed therein and two ratchet limiting grooves formed therein and communicating with the bore of the control ferrule for engaging with the retaining ring and for limiting the control ferrule to move relative to the tool shank and for preventing the control ferrule from being disengaged from the tool shank. The tool shank includes a stem extended outwardly therefrom.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
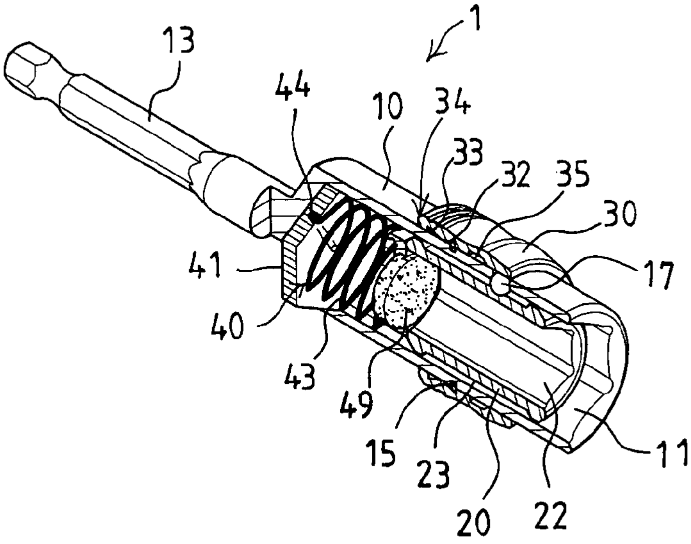
FIG. 1 is a perspective view of a tool device in accordance with the present invention, in which a portion of the tool device has been cut off for showing an inner structure of the tool device.
Figure 2:
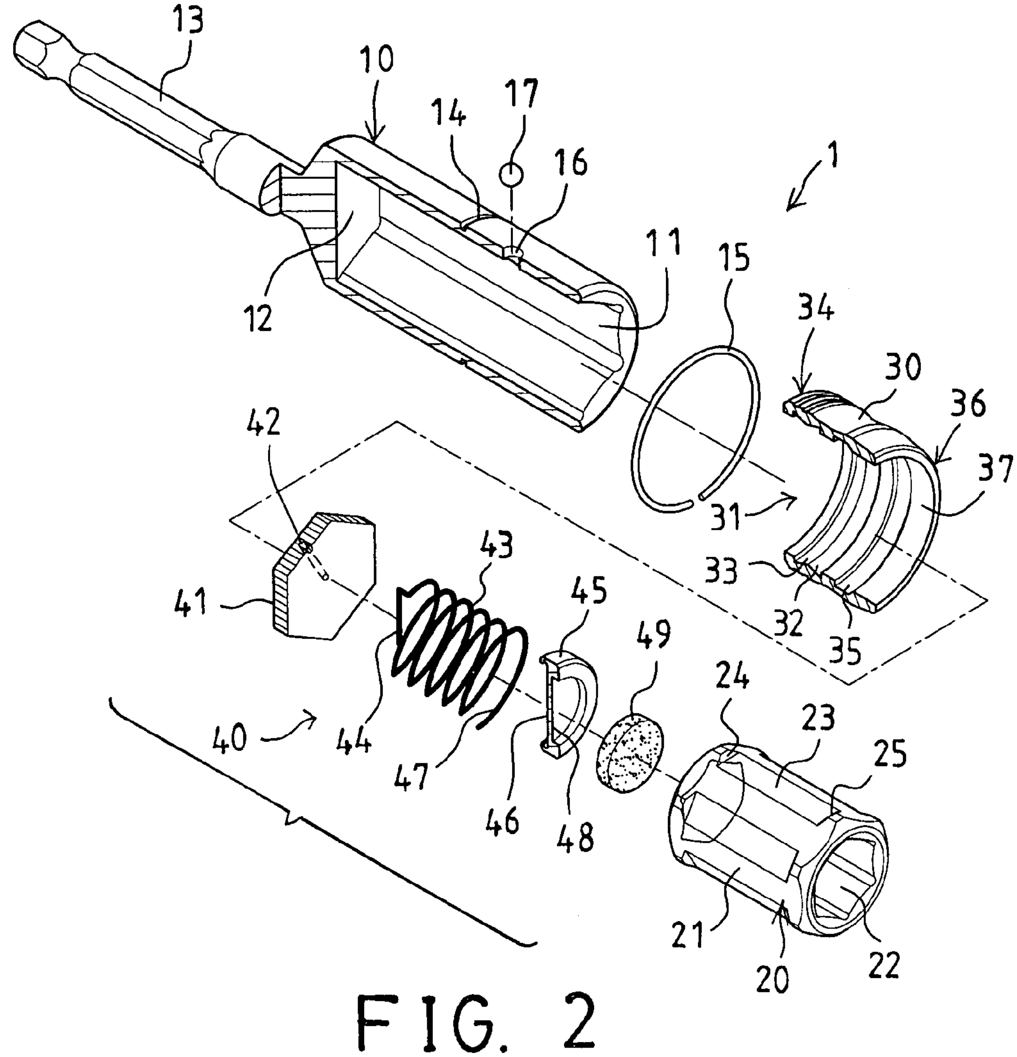
FIG. 2 is an exploded view of the tool device.
Figure 3:
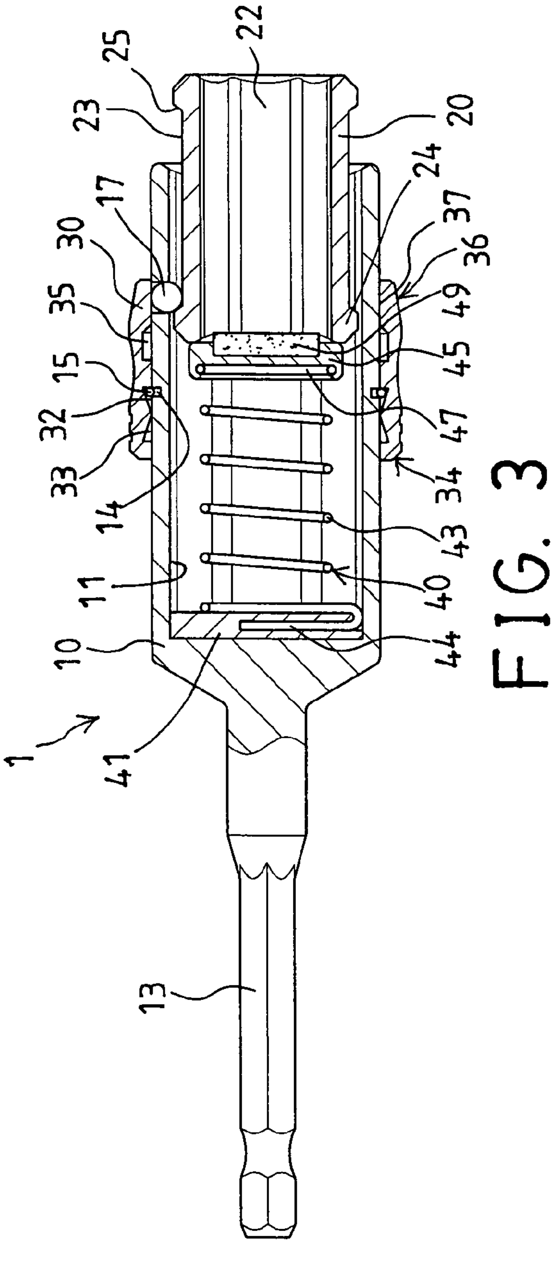
FIG. 3 is a plan schematic view of the tool device, in which a portion of the tool device has also been cut off for showing the inner structure of the tool device.

Referring to the drawings, and initially to FIGS. 1-3, a tool device 1 in accordance with the present invention comprises a socket or tool shank 10 including an engaging hole 11 formed in one end thereof and formed or defined by a bottom or inner or base portion 12 for receiving and driving a tool bit or tool member (not shown), and including a stem 13 extended outwardly from the other end thereof for being engaged with or coupled to the other driving tools and for being rotated or driven by the other driving tools. The tool shank 10 further include a peripheral groove 14 formed in the outer peripheral portion thereof for receiving a retaining ring 15 therein which is partially extended out of the outer peripheral portion of the tool shank 10.

It is preferable that the peripheral groove 14 is formed in the middle portion of the tool shank 10 for allowing the retaining ring 15 to be partially extended out of the middle portion of the tool shank 10. The tool shank 10 further includes an orifice 16 formed in the middle portion thereof and formed through the tool shank 10 and communicating with the engaging hole 11 of the tool shank 10 for receiving a detent 17, such as a ball-shaped detent 17 therein for allowing the detent 17 to be partially extended or engaged into the engaging hole 11 of the tool shank 10 in order to detachably anchoring or securing the tool bit or tool member to the tool shank 10. The engaging hole 11 of the tool shank 10 preferably includes a noncircular cross section, such as square, hexagonal cross section, or the like.

One or more auxiliary socket members 20 are replaceably or changeably engaged into the engaging hole 11 of the tool shank 10 and each include a noncircular outer peripheral portion having a number of flat surfaces 21 for engaging with the noncircular engaging hole 11 of the tool shank 10 and for allowing the socket members 20 to be selectively or changeably rotated or driven by the tool shank 10. The socket members 20 each include a socket opening or bore 22 formed therein, and the bores 22 of the socket members 20 also includes a noncircular cross section, such as square, hexagonal cross section, or the like, and include different sizes or diameters or dimensions for receiving various tool members of different sizes or diameters or dimensions, and for allowing the socket members 20 having different bores 22 to be selectively or changeably rotated or driven by the tool shank 10.

The socket members 20 each include one or more cut off portions or recesses 23 formed in the outer peripheral portion thereof and formed or located between the adjacent flat surfaces 21 of the socket members 20 for selectively receiving the detent 17 (FIG. 3) and for selectively or detachably securing or locking the socket members 20 to the tool shank 10; and each include one or more (such as two) projections or stops 24, 25 extended into each of the recesses 23 of the socket members 20 and located at the end portions of each of the recesses 23 of the socket members 20 for engaging with the detent 17 (FIGS. 3, 4) and for selectively or detachably anchoring the socket members 20 to the tool shank 10. The detent 17 may be selectively moved or engaged into the engaging hole 11 of the tool shank 10 for allowing the socket members 20 to be changeably engaged into or disengaged from the engaging hole 11 of the tool shank 10.

A sleeve or control ferrule 30 is slidably or rotatably attached or engaged onto the tool shank 10 or includes a bore 31 formed therein for slidably receiving the tool shank 10, and includes two peripheral and/or ratchet limiting grooves 32, 33 formed therein and located closer to one end or inner end 34 thereof and communicating with the bore 31 of the control ferrule 30 for receiving or engaging with the retaining ring 15 and for limiting the control ferrule 30 to move or to slide relative to the tool shank 10 and also for preventing the control ferrule 30 from being disengaged from the tool shank 10. The control ferrule 30 further includes a peripheral depression 35 formed in the inner peripheral portion thereof and preferably located closer to the other end or outer end 36 thereof for forming or defining an outer peripheral flange or actuator 37.

The inner peripheral depression 35 of the control ferrule 30 may be used for selectively receiving or engaging with the detent 17 (FIG. 4) and for allowing the detent 17 to be selectively moved or engaged into the engaging hole 11 of the tool shank 10, and thus for allowing the socket members 20 to be changeably engaged into or disengaged from the engaging hole 11 of the tool shank 10. On the contrary, when the control ferrule 30 is moved relative to the tool shank 10 to disengage the inner peripheral depression 35 of the control ferrule 30 from the detent 17, the actuator 37 or the control ferrule 30 may be engaged with the detent 17 (FIG. 3) for forcing the detent 17 to engage into either of the recesses 23 of the socket members 20 and to selectively or detachably anchor the socket members 20 to the tool shank 10.

Figure 4:
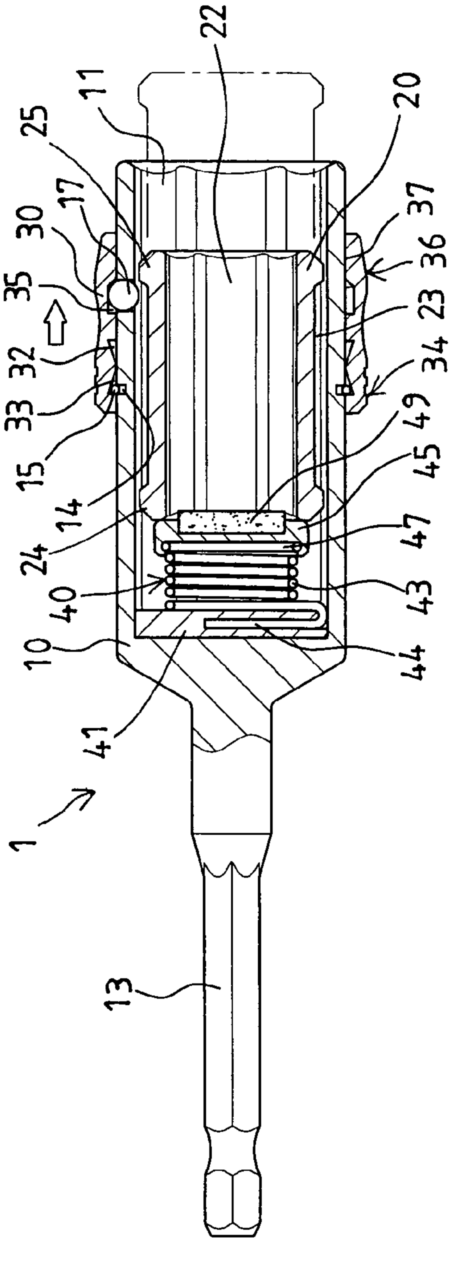
FIG. 4 is a plan schematic view similar to FIG. 3 illustrating the operation of the tool device.

In operation, as shown in FIG. 4, when the detent 17 is received or engaged into the inner peripheral depression 35 of the control ferrule 30, the socket members 20 may be selectively or changeably engaged into the engaging hole 11 of the tool shank 10. After the selected socket member 20 has been engaged into the engaging hole 11 of the tool shank 10, the control ferrule 30 may be moved relative to the tool shank 10 to disengage the inner peripheral depression 35 of the control ferrule 30 from the detent 17, or to engage the actuator 37 or the control ferrule 30 to engage with the detent 17 (FIG. 3) and to force the detent 17 to engage into either of the recesses 23 of the socket member 20 and thus to selectively anchor the socket members 20 to the tool shank 10. The detent 17 and/or the actuator 37 or the control ferrule 30 may thus be formed and acted as an anchoring means or device for detachably and slidably anchoring or securing the socket members 20 to the tool shank 10.

A spring biasing means or device 40 may further be provided and engaged into the engaging hole 11 of the tool shank 10, for engaging with the socket member 20 and for biasing the socket member 20 outwardly relative to the engaging hole 11 of the tool shank 10, for example, the spring biasing means or device 40 includes an anchor 41 engaged and force-fitted into the engaging hole 11 of the tool shank 10 and preferably engaging with the base portion 12 of the tool shank 10, and the anchor 41 includes an aperture 42 formed therein for receiving one end 44 of a spring member 43 which may apply a spring biasing force against the socket member 20, a slide or follower 45 is slidably received or engaged into the engaging hole 11 of the tool shank 10 and disposed between the socket member 20 and the spring member 43, the follower 45 includes a cavity 46 formed therein for receiving the other end 47 of the spring member 43.

In operation, as shown in FIG. 3, the spring member 43 of the spring biasing means or device 40 may apply a spring biasing force onto or against the socket member 20 in order to bias or force the socket member 20 to move outwardly relative to the engaging hole 11 of the tool shank 10 for allowing the tool bit or tool member (not shown) to be selectively engaged into the bores 22 of the socket members 20 and to be rotated or driven by the socket members 20 and thus the tool shank 10. As shown in FIG. 4, the socket member 20 may also be forced or moved against the spring member 43 and engaged into the engaging hole 11 of the tool shank 10 for allowing the tool bit or tool member (not shown) to be selectively engaged with the engaging hole 11 of the tool shank 10.

The follower 45 may be secured to the other end 47 of the spring member 43 with such as a force-fitted engagement, or adhesive materials, or latches or fasteners (not shown), and may further include a space 48 formed therein and formed or provided opposite to the cavity 46 thereof or facing away from the spring member 43 for partially receiving or engaging with a magnet or magnetic attractive member 49 therein which may be simply attached or engaged with or adhered to the follower 45 and which may be engaged with or acted with the socket members 20 for attracting the socket members 20 to the follower 45 and thus for retaining the socket members 20 to the tool shank 10, and/or for preventing the socket members 20 from being disengaged from the tool shank 10.

Figure 5:
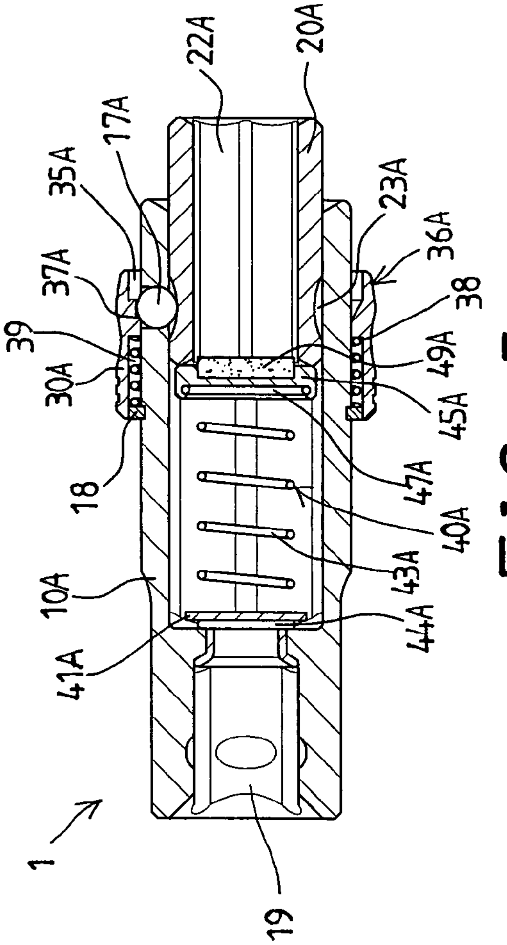
FIG. 5 is a cross sectional view similar to FIGS. 3 and 4, illustrating the other arrangement of the tool device.
Figure 6:
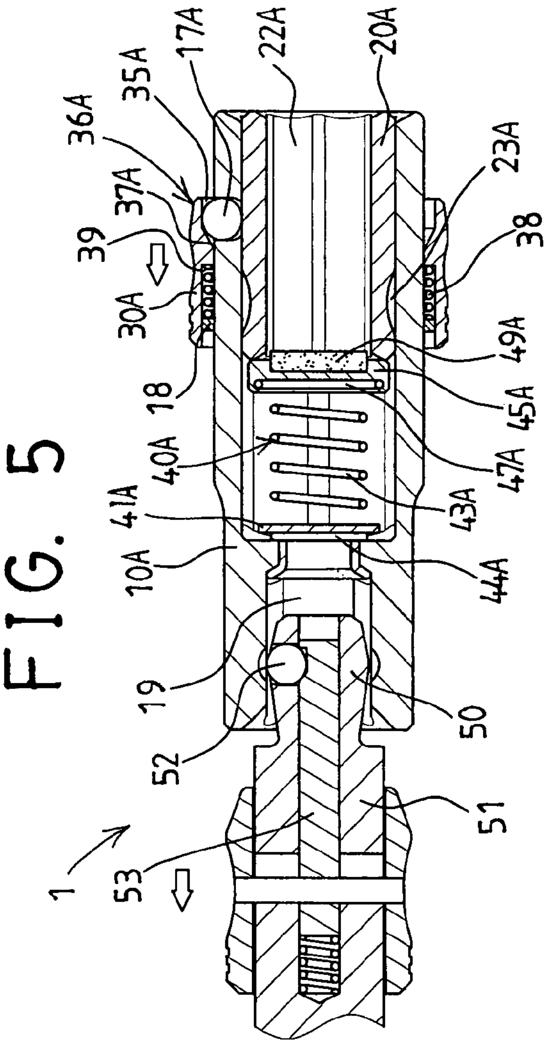
FIG. 6 is a cross sectional view similar to FIG. 5 illustrating the operation of the tool device as shown in FIG. 5.

Alternatively, as shown in FIGS. 5 and 6, the tool shank 10A also includes a detent 17A slidably engaged therein and partially extendible or engageable into the tool shank 10A and engageble into the recesses 23A of the socket members 20A for selectively or detachably securing or locking the socket members 20A to the tool shank 10A. The socket members 20A also include the bores 22A of different sizes or diameters or dimensions for receiving various tool members of different sizes or diameters or dimensions. The control ferrule 30A is also slidably or rotatably attached or engaged onto the tool shank 10A and includes a peripheral depression 35A formed in the inner peripheral portion thereof and preferably located closer to the other end or outer end 36A thereof for forming or defining an outer peripheral flange or actuator 37A.

A spring member 38 is further provided and disposed or engaged in an inner peripheral recess 39 of the control ferrule 30A and engaged with the retaining ring 18 which is engaged or attached or secured on the outer peripheral portion of the tool shank 10A for forcing the actuator 37A or the control ferrule 30A to engage with the detent 17A and thus for forcing the detent 17A to engage into either of the recesses 23A of the socket members 20A and to selectively or detachably anchor the socket members 20A to the tool shank 10A. A spring biasing means or device 40A may also be provided and engaged into the tool shank 10A and includes an anchor 41A engaged and force-fitted into the tool shank 10A, and a spring member 43A having one end 44A engaged into the anchor 41A, a slide or follower 45A is slidably received or engaged into the tool shank 10A and disposed between the socket member 20A, and the other end 47A of the spring member 43A is engaged into the follower 45A.

The follower 45A may further include a magnet or magnetic attractive member 49A received or engaged into the follower 45A engaged with or acted with the socket members 20A for attracting the socket members 20A to the follower 45A and thus for retaining the socket members 20A to the tool shank 10A, or for preventing the socket members 20A from being disengaged from the tool shank 10A. Instead of the stem 13 (FIGS. 1-4), the tool stem 10A may include a socket opening 19 formed therein and having a noncircular cross section, such as square, hexagonal cross section, or the like for engaging with a corresponding noncircular driving head 50 of a driving tool element 51 and for allowing the tool stem 10A to be rotated or driven by the driving tool element 51. The driving tool element 51 may include an actuator 53 for engaging with a detent 52 and for forcing the detent 52 to selectively engaging with the tool stem 10A and to detachably anchoring or securing the tool stem 10A to the driving tool element 51.

Figure 7:
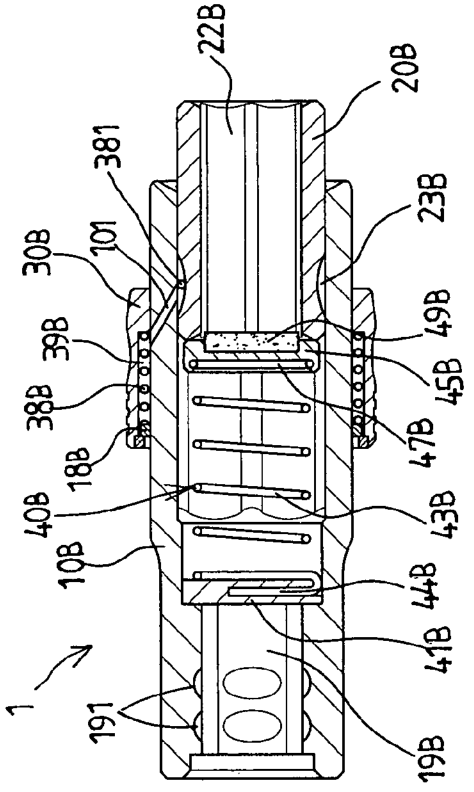
FIG. 7 is a cross sectional view similar to FIG. 5, illustrating the further arrangement of the tool device.
Figure 8:
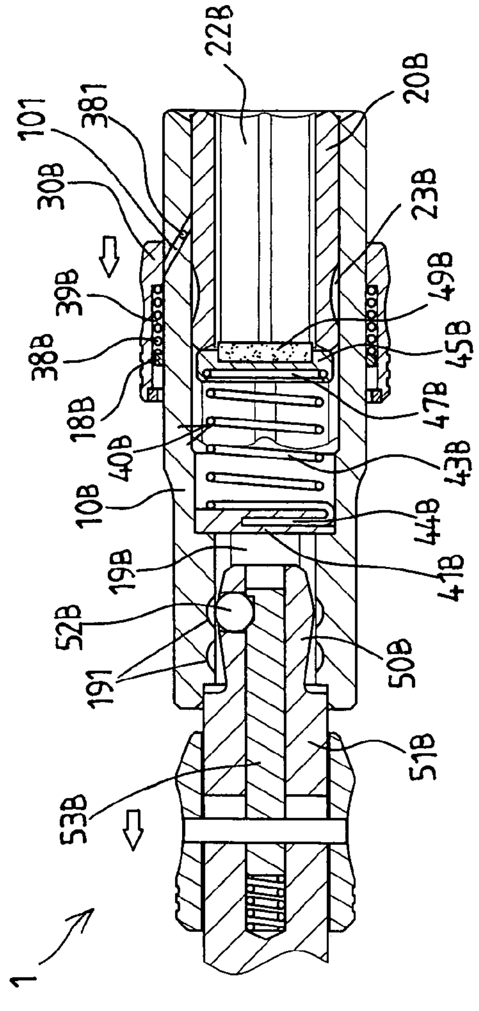
FIGS. 8, 9 are cross sectional views similar to FIG. 7 illustrating the operation of the tool device as shown in FIG. 7.
Figure 9:
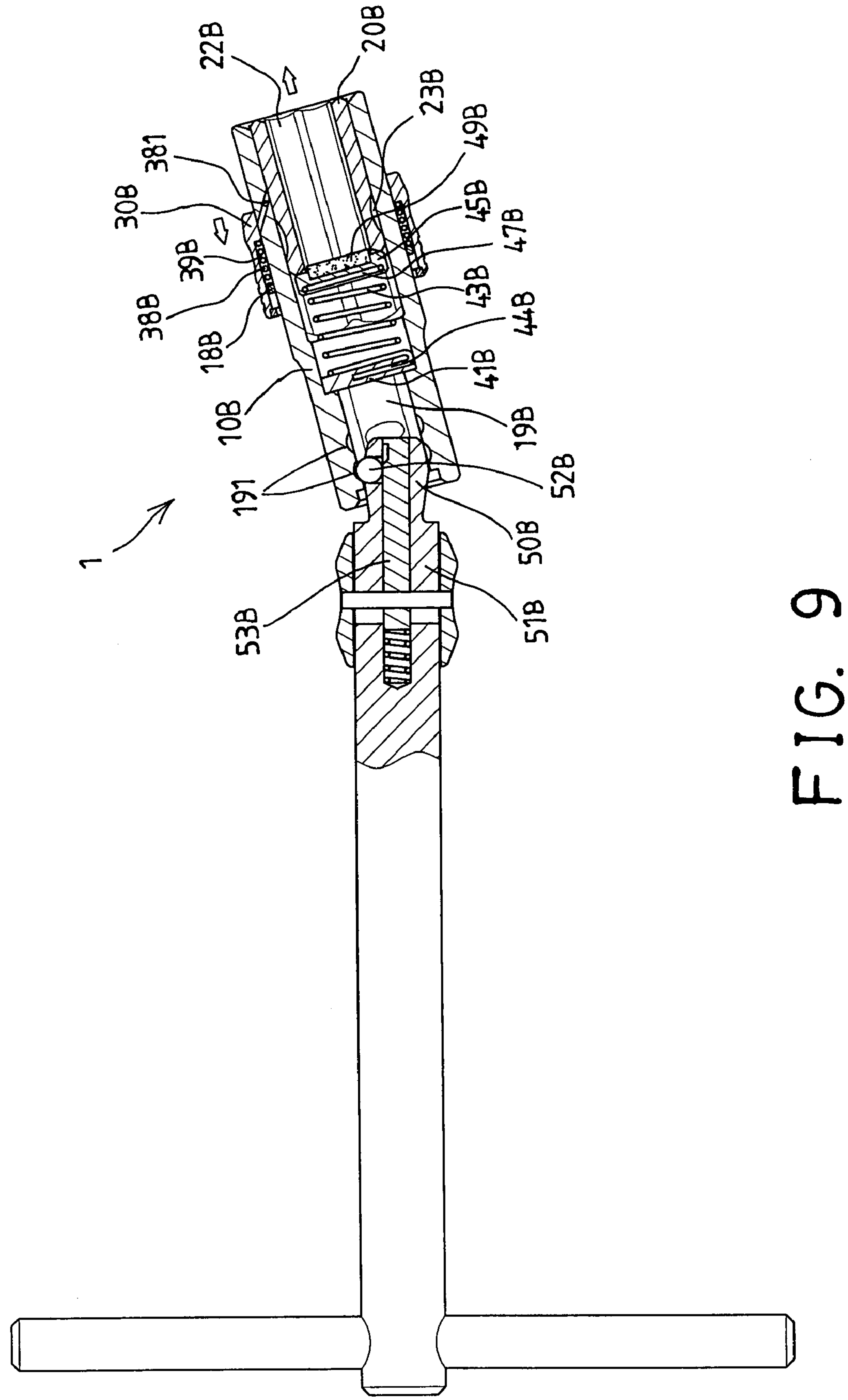

Further alternatively, as shown in FIGS. 7, 8 and 9, the tool shank 10B also includes a control ferrule 30B slidably or rotatably attached or engaged onto the tool shank 10B, and a spring member 38B disposed or engaged in an inner peripheral recess 39B of the control ferrule 30B and engaged with the retaining ring 18B which is engaged or attached or secured on the outer peripheral portion of the tool shank 10B. Instead of the detent 17 (FIGS. 1-4) or 17A (FIGS. 5-6), the spring member 38B includes one end 381 slidably engaged in an inclined passage 101 of the tool shank 10B and partially extendible or engageable into the tool shank 10B and engageble into the recesses 23B of the socket members 20B for selectively or detachably securing or locking the socket members 20B to the tool shank 10B. The socket members 20B may also include the bores 22B of different sizes or diameters or dimensions for receiving various tool members of different sizes or diameters or dimensions.

A spring biasing means or device 40B may also be provided and engaged into the tool shank 10B and includes an anchor 41B engaged and force-fitted into the tool shank 10B, and a spring member 43B having one end 44B engaged into the anchor 41B, a slide or follower 45B is slidably received or engaged into the tool shank 10B and disposed between the socket member 20B, and the other end 47B of the spring member 43B is engaged into the follower 45B. The follower 45B may further include a magnet or magnetic attractive member 49B received or engaged into the follower 45B engaged with or acted with the socket members 20B for attracting the socket members 20B to the follower 45B and thus for retaining the socket members 20B to the tool shank 10B, or for preventing the socket members 20B from being disengaged from the tool shank 10B.

Instead of the stem 13 (FIGS. 1-4), the tool stem 10B may also include a socket opening 19B formed therein and having a noncircular cross section, such as square, hexagonal cross section, or the like for engaging with a corresponding noncircular driving head 50B of a driving tool element 51B and for allowing the tool stem 10B to be rotated or driven by the driving tool element 51B. The driving tool element 51B may include an actuator 53B for engaging with a detent 52B and for forcing the detent 52B to selectively engaging with the tool stem 10B and to detachably anchoring or securing the tool stem 10B to the driving tool element 51B. The tool shank 10B further includes two or more cavities 191 formed therein for selectively receiving or engaging with the detent 52B and for selectively or detachably anchoring or securing the tool stem 10B to the driving tool element 51B.

Accordingly, the tool device in accordance with the present invention includes one or more auxiliary socket members replaceable or changeable with each other for receiving and for driving various tool members of different sizes or diameters or dimensions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool device comprising:

a tool shank including an engaging hole formed in one end of said tool shank, and said engaging hole including a noncircular cross section, said tool shank including an orifice formed therein, a socket member slidably engaged into said engaging hole of said tool shank and including a noncircular outer peripheral portion for engaging with said noncircular engaging hole of said tool shank and for allowing said socket member to be rotated or driven by said tool shank, said socket member including a bore formed therein and having a noncircular cross section, said socket member including at least one recess formed in an outer peripheral portion thereof and including at least one stop extended into said at least one recess of said socket member and located at one end portion of said at least one recess of said socket member, means for biasing said socket member outwardly relative to said engaging hole of said tool shank, and said biasing means including a spring member engaged into said engaging hole of said tool shank for applying a spring biasing force against said socket member, means for detachably and slidably anchoring said socket member to said tool shank, said anchoring means including a detent slidably received and engaged into said orifice of said tool shank and extendible into said engaging hole of said tool shank for selectively engaging with said at least one recess of said socket member and for selectively engaging with said at least one stop of said socket member and for detachably anchoring said socket member to said tool shank, and said anchoring means including a control ferrule slidably engaged onto said tool shank and selectively engageable with said detent and for selectively forcing said detent to engage with said socket member, and said control ferrule including a peripheral depression formed in an inner peripheral portion thereof for selectively receiving said detent and for forming an actuator which is selectively engageable with said detent to selectively force said detent to engage with said socket member.

2. The tool device as claimed in claim 1, wherein said biasing means includes a follower slidably received and engaged into said engaging hole of said tool shank and disposed between said socket member and said spring member.

3. The tool device as claimed in claim 2, wherein said follower includes a cavity formed therein for receiving one end of said spring member.

4. The tool device as claimed in claim 2, wherein said biasing means includes a magnetic attractive member attached to said follower and acted with said socket member for attracting said socket member to said follower and for preventing said socket member from being disengaged from said tool shank.

5. The tool device as claimed in claim 4, wherein said follower includes a space formed therein for receiving said magnetic attractive member.

6. The tool device as claimed in claim 1, wherein said biasing means includes an anchor engaged into said engaging hole of said tool shank for engaging with a first end of said spring member.

7. The tool device as claimed in claim 6, wherein said anchor includes an aperture formed therein for receiving said first end of said spring member.

8. The tool device as claimed in claim 1, wherein said socket member includes a plurality of flat surfaces formed in said outer peripheral portion thereof, and said at least one recess is formed and located between adjacent flat surfaces of said socket member.

9. The tool device as claimed in claim 1, wherein said tool shank includes a retaining ring attached onto an outer peripheral portion thereof, and said control ferrule includes a bore formed therein and two ratchet limiting grooves formed therein and communicating with said bore of said control ferrule for engaging with said retaining ring and for limiting said control ferrule to move relative to said tool shank and for preventing said control ferrule from being disengaged from said tool shank.

10. The tool device as claimed in claim 1, wherein said tool shank includes a stem extended outwardly therefrom.

* * * * *